(No Model.) 7 Sheets—Sheet 3.
J. HOLROYD, C. B. HUNT & R. J. JOHNS.
SEWING MACHINE.
No. 521,372. Patented June 12, 1894.
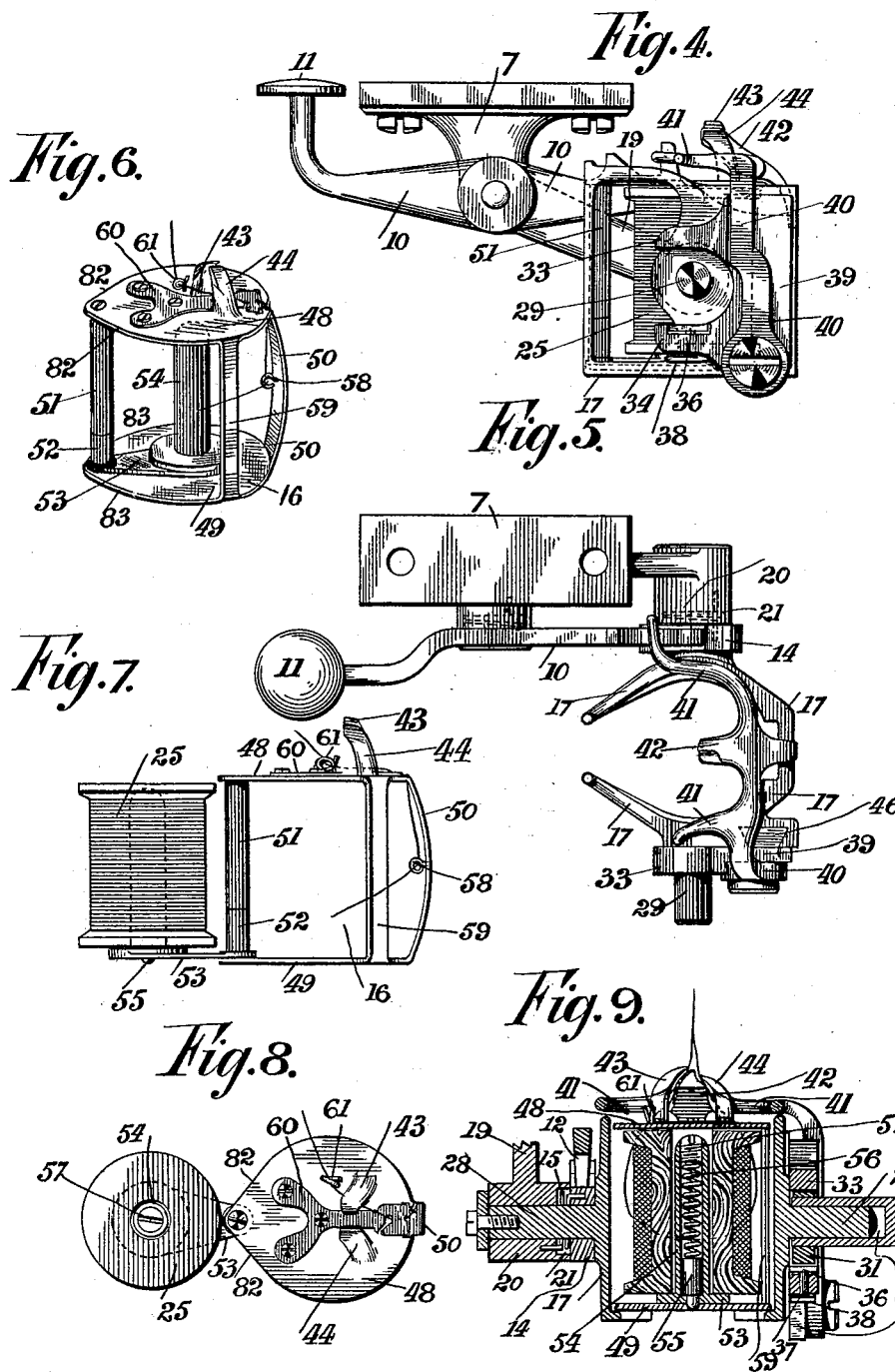

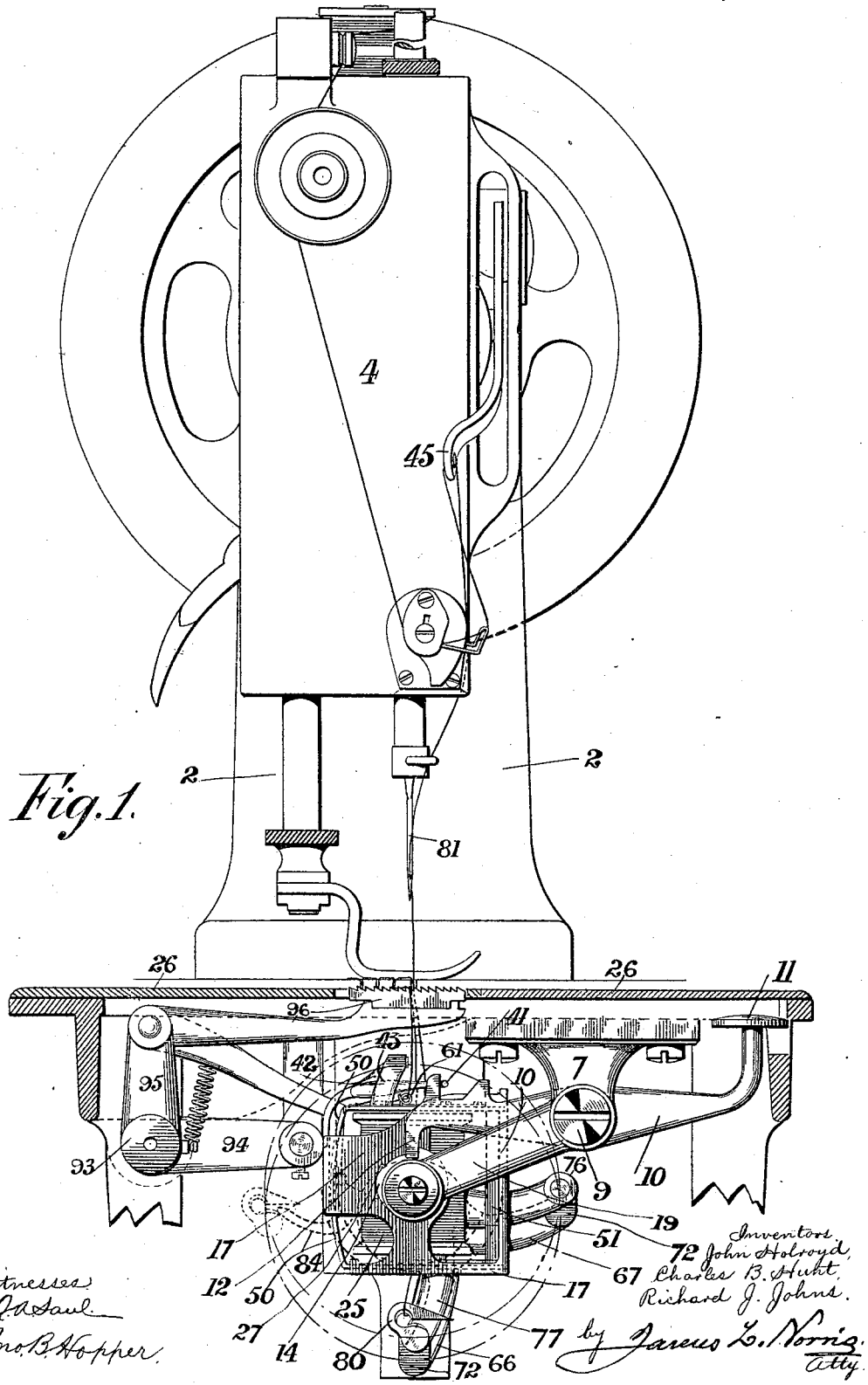

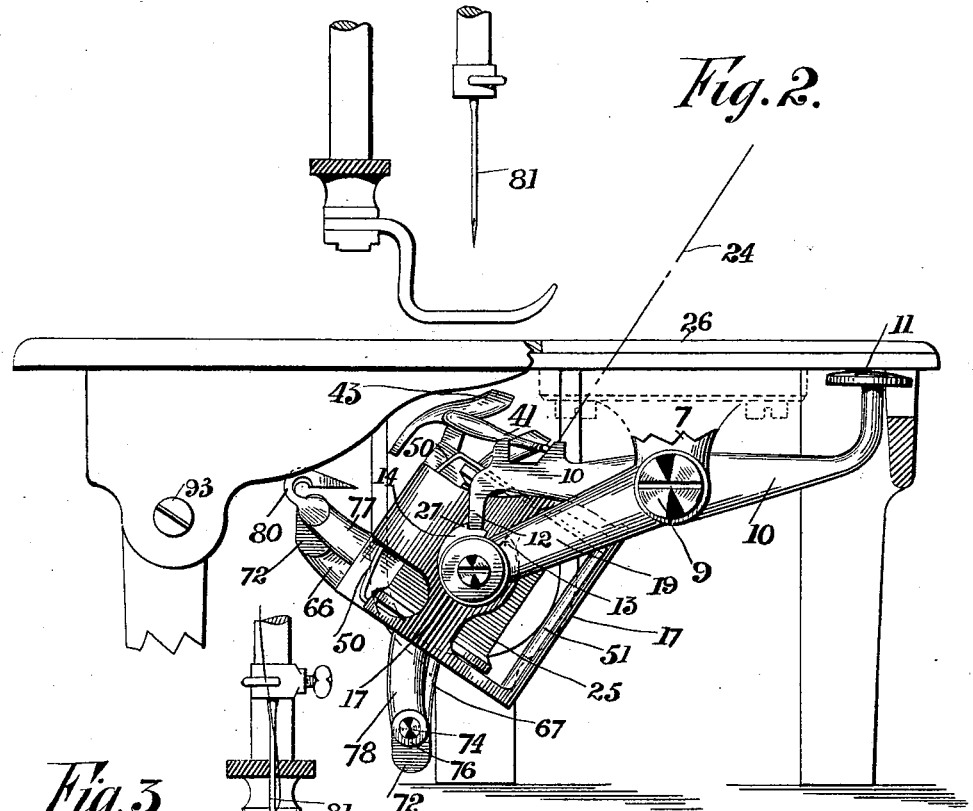
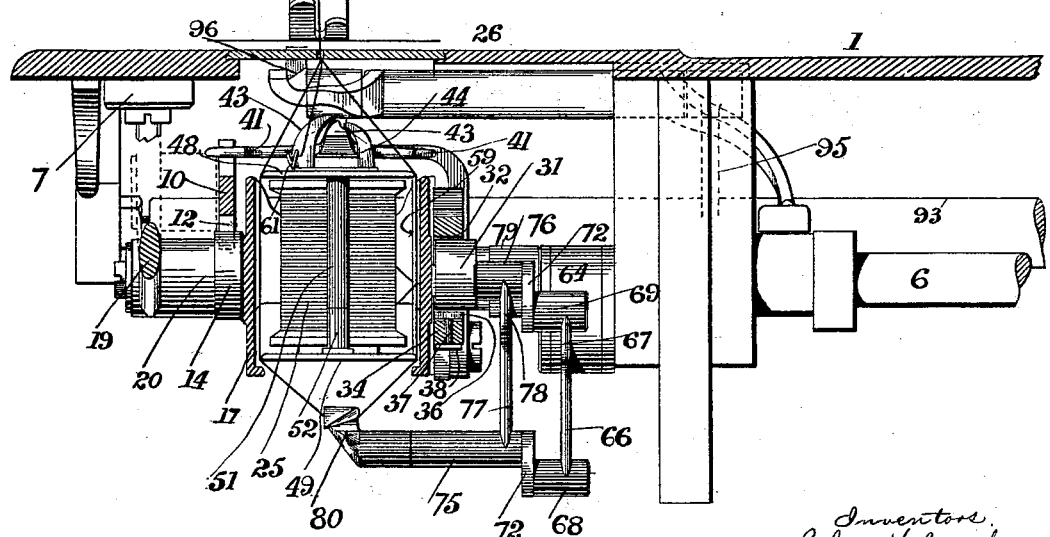

(No Model.) 7 Sheets—Sheet 4.

J. HOLROYD, C. B. HUNT & R. J. JOHNS.
SEWING MACHINE.

No. 521,372. Patented June 12, 1894.

Witnesses
J. A. Saul
Jno. B. Hopper

Inventors
John Holroyd,
Charles B. Hunt,
Richard J. Johns,
by James L. Norris
Atty.

THE NATIONAL LITHOGRAPHING COMPANY,
WASHINGTON, D. C.

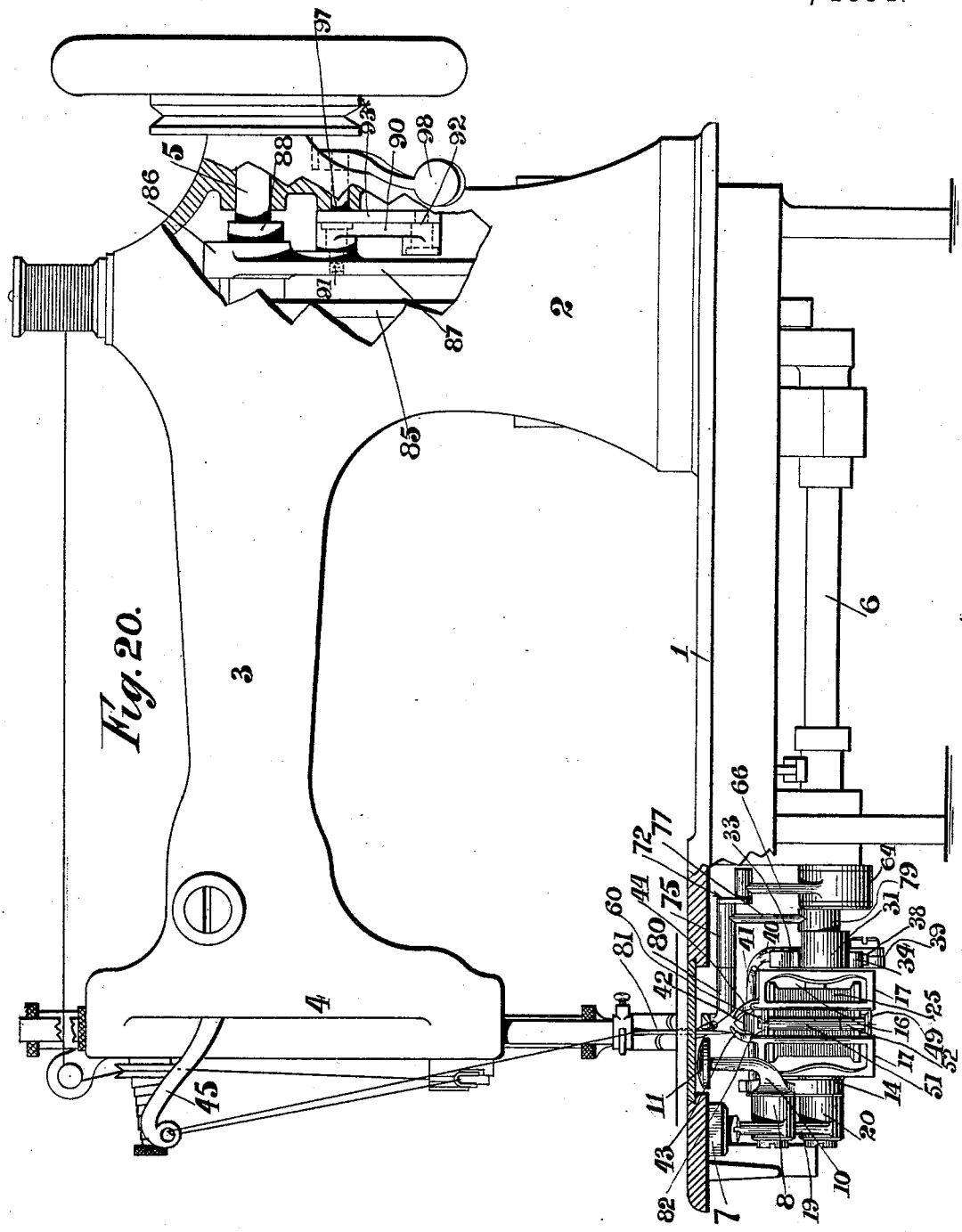

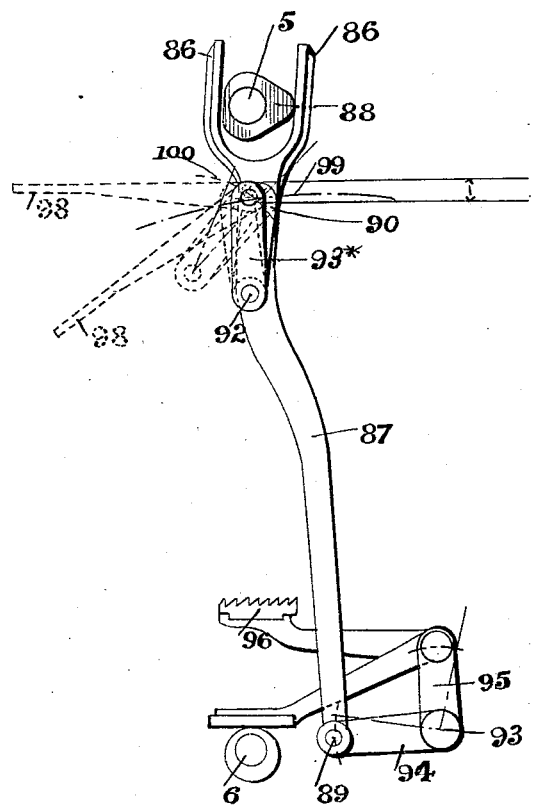

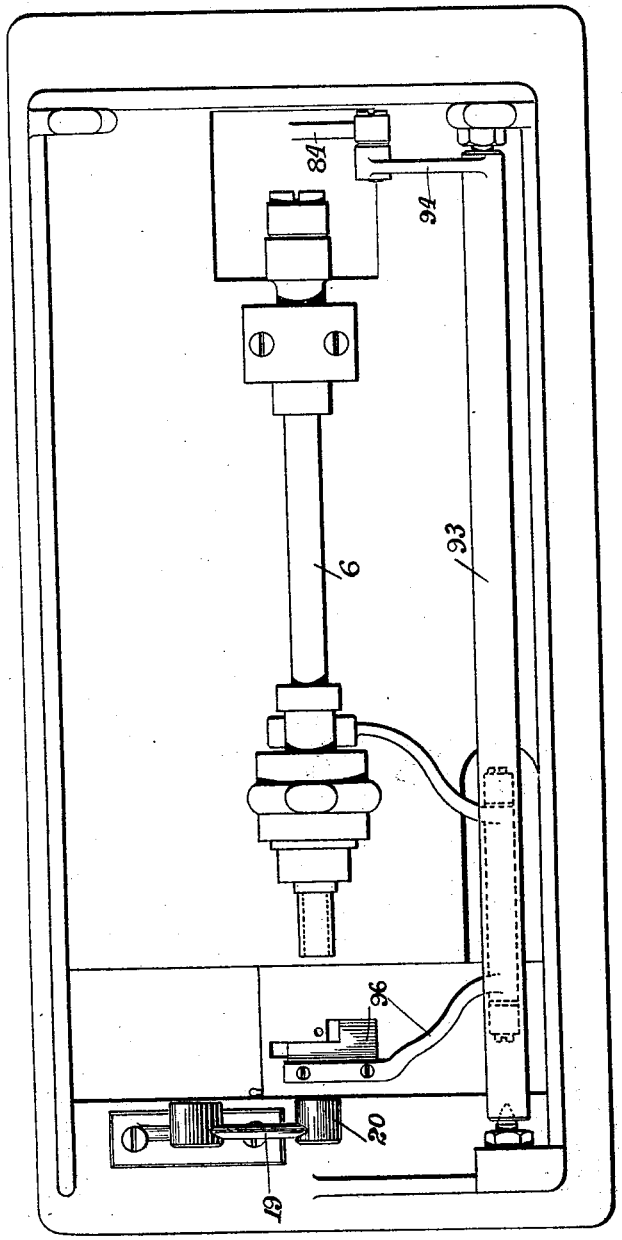

UNITED STATES PATENT OFFICE.

JOHN HOLROYD, CHARLES BRANSTON HUNT, AND RICHARD JOSEPH JOHNS, OF LONDON, ENGLAND, ASSIGNORS TO THE NEW BRANSTON TWO REEL SEWING MACHINE COMPANY, LIMITED, OF SAME PLACE.

SEWING-MACHINE.

SPECIFICATION forming part of Letters Patent No. 521,372, dated June 12, 1894.

Application filed November 9, 1893. Serial No. 490,485. (No model.) Patented in England September 12, 1893, No. 17,155.

*To all whom it may concern:*

Be it known that we, JOHN HOLROYD, CHARLES BRANSTON HUNT, and RICHARD JOSEPH JOHNS, subjects of the Queen of Great Britain, all residing at 59 Holborn Viaduct, in the city of London, England, have invented certain new and useful Improvements Connected with Two-Reel Sewing-Machines, (patented in Great Britain, No. 17,155, dated September 12, 1893,) of which the following is a specification.

This invention has for its object certain detail construction of fittings of two reel sewing machines, and in arrangements of parts and their operation for first governing the motion of the looper for carrying the needle thread around the lower reel and its holder; second, enabling the lower reel and its appliances to be lifted or suspended for the thread ances to be lifted or suspended for the thread to pass forwardly and under and then to be released for the "take up" to act for drawing in the slack thread; third, enabling the lower reel and its holder to be swung or canted from its working position for the insertion of a fresh reel; fourth, enabling the reel carrying pillar to be swung clear of the holder to facilitate the removal and insertion of reels.

Our invention is clearly represented on the annexed drawings.

Figure 10:
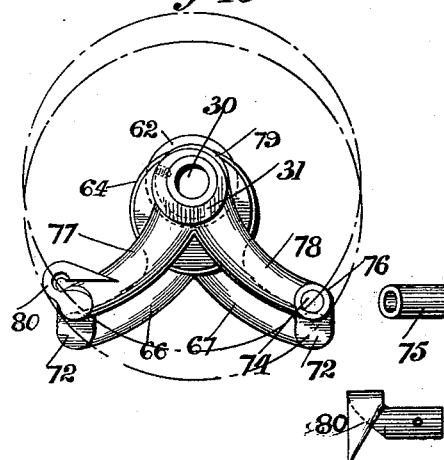
Figure 11:
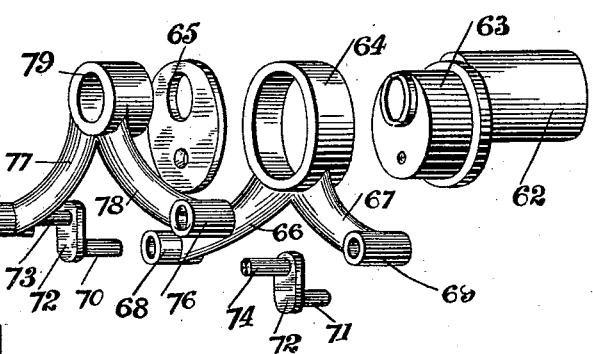
Figure 12:
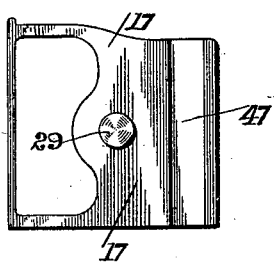
Figure 13:
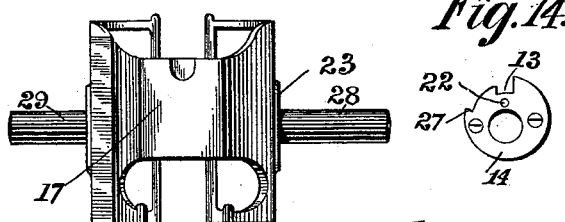
Figure 14:
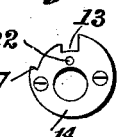
Figure 15:
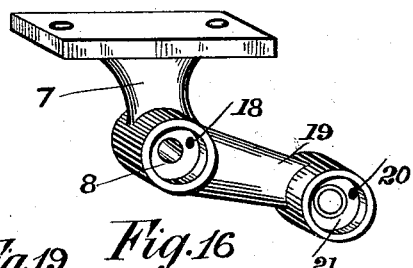
Figure 17:
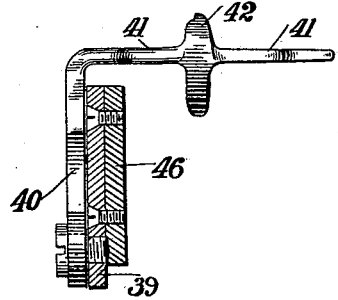
Figure 18:
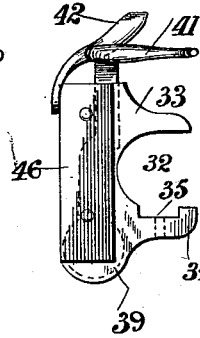
Figures 16, 19:

Figure 1 is a front elevation of a two reel sewing machine with the work plate in transverse section through the line of the feed foot slot; Fig. 2, a front elevation of the lower part only, and with the lower reel canted forwardly for lifting through the sliding plate aperture of the work plate; Fig. 3, a part longitudinal section. The arrangement of the mechanism in connection with the lower reel is shown in its assembled condition. Fig. 4 is a reverse side elevation of the canting appliances to that shown at Figs. 1 and 2 with reel and holder lifting apparatus operable by cam from the under shaft; Fig. 5, a plan of same; Fig. 6, a perspective elevation of a reel holder with swiveling plate and pedestal for carrying the reel; Figs. 7 and 8 side elevation and plan of reel holder with plate and pedestal swung outwardly for the ready affixture or removal of reels; Fig. 9, a section of reel pedestal holder and shaft connection; Fig. 10, a front elevation of looper and its actuating appliances. Fig. 11 shows the several parts of the looper mechanism detached and approximately in the positions they are intended for when assembled. Figs. 12 and 13, are side and back elevations of reel holder carrying bracket; Fig. 14, a view of cam and catch plate of the reel canting appliances; Fig. 15, a perspective elevation of arm by which the lower reel and its appendages are carried; Fig. 16, a detached view of coiled spring wire for fixing the reel and its bracket in a canted condition; Figs. 17 and 18, detached views of appliances by which the reel and its holder are lifted in the bracket for the loop thread to pass under them without frictional contact; Fig. 19, a view of buffer and spring to keep cam silent while machine is running; Fig. 20, an elevation of complete machine with certain parts in section for showing under gear and appliances termed a stitch regulator from the back link or connecting rod; Fig. 21, a detached view of stitch regulator; Fig. 22, a bottom plan of machine showing how the feed is governed.

1, is a base plate; 2, upright; 3, arm; 4, head; 5, upper shaft, and 6 under shaft of machine; 7, lug screwed under the base plate and having its boss 8 as a pivotal center for the bolt 9 and arm 10 to rock on when the button 11 is depressed, which action causes the locking nose 12 to leave the notch 13 of the disk 14 and the spring 15 to cant the reel holder 16 and bracket 17. The spring 15 of the button arm 10 is in tension with one end in a hole or eye 18 and the other in the arm 10.

19, is an extension from the boss 8 and has boss 21 for the reception of a spring similar to that shown at Fig. 16, one end of said spring being in a hole 20 in the boss 21, and the other in the hole 22 of the disk 14 which is secured to the side 23 of the bracket 17, said spring being in tension to pull the bracket to the position represented by the dotted line 24 in Fig. 2, when the button 11 is depressed to remove the nose 12 from the notch 13 so that the bracket 17 with its contained reel holder 16 and reel 25 can spring over until the stop 27 bears against the nose 12 of the arm 10.

When the reel 25 is replaced or a fresh one put into the holder 16 the holder is replaced into the bracket 17 and the bracket is moved back until the nose 12, re-engages in the notch 13 to fix the bracket 17 vertically. The bracket 17 swivels on axles 28, 29, the axle 28 passing into and through boss of the extension 19. The other axle 29 of the bracket 17 is sufficiently long to enter a hole 30 of the under shaft 6 the extremity of which carries a cam 31 to travel round with said shaft 6. This cam 31 fits a forked recess 32 of the reel and holder lifting appliance 33. One leg 34 of said appliance 33 has a recess 35 for a head 36 of a stud pin 37 to lodge in, such pin bearing on a spring 38, and its head acting as a buffer to press against the cam 31 to prevent jumping noise at that part while the machine is running. The forked plate of the appliance 33 has fixed at 39 a leg 40 of a combined thread guide 41 and lift prong 42 the latter of which projects between two curved horns 43, 44, standing up from the reel holder 16, one of them being slightly higher than the other to regulate the passage of the upper thread loop when being drawn by the "take up" 45.

The plate 32 of the lifting appliance has a V shaped piece 46 fitting a corresponding shaped groove 47 at one side of the bracket 17 for insuring the direct up and down motion of the lifting appliance under the action of the cam 31.

The reel holder 16 is composed of two disks 48, 49, connected by a bar 50 in a piece therewith, and a post 51 screwed to the disks. The post 51 has a reduced diameter at its lower part and this is encircled by a swiveling sleeve 52 of a plate 53, the inner end of which has the reel carrying pedestal 54 standing up from it, said pedestal is hollow for holding a plunger 55, and spring 56 within it, these being retained in place by a screw pin 57. The lower end of the plunger 55 projects through the plate 53 and when in the position seen at Fig. 9 said pin enters a central recess of the disk 49 to fix the reel temporarily in the holder but said pedestal can be readily slued round on the post 51, as at Figs. 7 and 8 for placing a reel over the pedestal to centralize it in the holder. The bar 50 has an eye 58 in the inner face for leading the thread from the reel which stands vertically in its holder.

59, is a guide bar for leading the thread from the reel to the eye 58. The spring 60 prevents the thread being drawn from the reel too rapidly.

61, is an additional eye on the disk 48 for guiding the thread to the needle hole in the work plate.

The reel holder 16 is lifted by the cam 31 just when the upper thread loop is approaching and passing under it, as at Fig. 3, and as soon as the loop is clear the holder drops down in the bracket 17 to leave an opening between the lifter 42, and the horns 43, 44, for the loop thread to be drawn in by the "take up." The inner bottom surface of the bracket 17 is inclined slightly from back to front and the holder in its drop slides forwardly and gives a positive clearance between its back and the bracket for the loop thread to be drawn in without friction, the shape and curvature of the lifter 42 and horns 43, 44, being such that while the holder is being lifted it slides slightly to the rear to ease the touch of the loop thread while it passes under.

62 is a sleeve fixed on the under shaft 6; said sleeve is in a piece with an eccentric 63 encircled by the strap 64 and kept in place by the face plate 65. This strap has two curved arms 66, 67, with socket ends 68, 69, for the reception of crank pins 70, 71, which project from webs 72, 72, other crank pins 73, 74 on the opposite sides of the webs 72, 72, fitting in sockets 75, 76, of two arms 77, 78, of a collar 79, the latter being fixed on the under shaft 6 to draw round the eccentric strap 64 and its arms 66, 67, the hook 80 being by these means kept in a horizontal plane during its complete travel round the bracket 17 in which the reel and its holder are inclosed. One of the sockets, viz 75 is longer than the other and forms a sleeve for the extra long pin 73 of the web 72 to pass through and to which the hook 80 is secured. The hook 80 in its circular travel passes close to the needle 81 to engage the loop made in the well known manner, and as it travels it drags the upper thread down the front of the holder 16 and between it and the bracket 17, the loop gradually opening out and widening by riding against the inclines 82, 83, of the two disks 48, 49, until it passes under the bottom disk 49 to the rear where from the open state of the loop, see dotted lines 84, Fig. 1, the hook 80 moves clear and leaves the loop to be drawn in by the "take up" 45.

The upper shaft 5 by the rod 85 produces rotation of under shaft 6 in the well known manner. The forked end 86 of the lever 87 is operated by the cam 88 on the driving shaft 5 the opposite end of the lever being pivoted at 89 to the crank 94 projecting from the rocking shaft 93. The lever 87 has a link 90 pivoted to it at 91 the lower end of the link 90 being pivoted at 92 to a corresponding link 93* lying directly behind it and having its upper end fixed to an axle 97 passing through the upright 2 of the machine where it is provided with a hand lever 98 for regulating the feed of the material through the machine in the following manner: When the links 90 and 93* are in the position shown by the full lines in Figs. 20 and 21 a to and fro motion only is imparted to the lever 87 by the operating cam 88 and consequently the cranks 94 and 95 do not vibrate as the lever 87 moves only to and fro from its pivot 89 similarly the link 90 pivoted to 87 at 91 vibrates upon its center 92, through the arc 99 which is nearly a horizontal line. The amount of vibration of the rocking shaft 93 and consequently the movement of the feed 96 can be increased by lifting the thumb lever 98 to move the links 90 and 93* to the position indicated by the dotted lines in Fig. 21 or in any intermediate position according to the length of stitch required. In this case the lever 87 is not only caused to move to and fro by the cam 88 but also to rise and fall by reason of the link 90 which is pivoted to it, having its direction of vibration altered from the horizontal to that approaching the vertical as indicated by the arc 99, Fig. 21, the link 90 having its pivotal movement from the point 92 lifts the lever 87 in the direction of the arc 100. The motion thus given to the lever 87 by its connection with the rocking shaft 93 through the cranks 94 and 95 is communicated to the feed 96.

What we claim, and desire to secure by Letters Patent of the United States, is—

1. In a reel sewing-machine, the combination of the reel-carrying bracket 17 provided with trunnions pivotally mounted in bearings, a spring for tilting said bracket in its bearings, a disk 14 arranged over one of said trunnions and secured to one side of said bracket, said disk being provided upon its periphery with a notch 13, a pivoted lever 10 provided at one end with a hook or nose 12, and a spring 15 for normally holding said hook or nose in engagement with the notch 13 to lock the bracket in operative position, substantially as described.

2. In a reel sewing-machine, the combination of the reel-carrying bracket 17 provided with trunnions pivotally mounted in bearings, a spring for tilting said bracket in its bearings, a disk 14 arranged over one of said trunnions and secured to one side of said bracket, said disk being provided upon its periphery with a notch 13 and a stop or shoulder 27, a pivoted lever 10 provided at one end with a hook or nose 12, and a spring 15 for normally holding said hook or nose in engagement with said notched disk to lock the bracket in operative position, substantially as described.

3. The combination with the reel holder consisting of the disks 48 and 49 connected together by the posts 50 and 51, of the swinging reel support consisting of the plate 53 pivotally mounted on the post 51 and carrying a hollow pedestal 54, a plunger 55 projecting through an aperture in the bottom of said plunger and engaging a centrally arranged recess in the disk 49, a spring 56 arranged within the hollow pedestal, and a screw plug 57 for controlling the tension of said spring, substantially as described.

4. The combination with the bracket 17 of the reel holder 16 provided upon its upper side with two lugs 43 and 44 curved upwardly and toward each other, one of said lugs being higher than the other, the shaft 6, the cam 31 mounted on said shaft, and the reel lifting device actuated by said cam and provided with the curved thread guides 41 and a lifting prong 42 engaging the lugs 43 and 44, substantially as described.

5. In a two reel sewing machine, arms 66, 67, on collar 64 in combination with arms 77, 78 on socket 79 employed in conjunction with cranks 70, 71, 73, 74 for operating hook 80 from eccentric 63, arms 77, 78 with boss 79 being fixed to under shaft 6, substantially as described.

In witness whereof we have hereto signed our names, in the presence of two subscribing witnesses, this 24th day of October, 1893.

JOHN HOLROYD.
CHARLES BRANSTON HUNT.
RICHARD JOSEPH JOHNS.

Witnesses:
RICHARD CORE GARDNER,
*Patent Agent, 166 Fleet Street, London, England.*
ALEX. RIDGWAY,
*Notary Public, St. Michael's Alley, E. C.*